No. 892,581. PATENTED JULY 7, 1908.
G. CHENOT.
FILTERING WELL.
APPLICATION FILED NOV. 30, 1906.
4 SHEETS—SHEET 3.
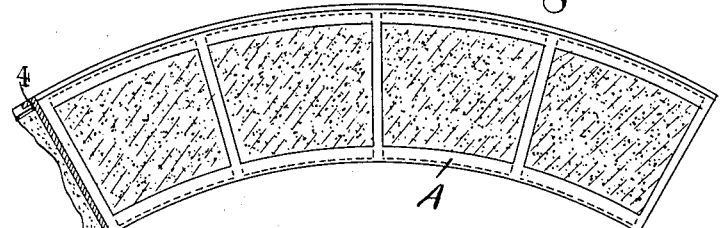
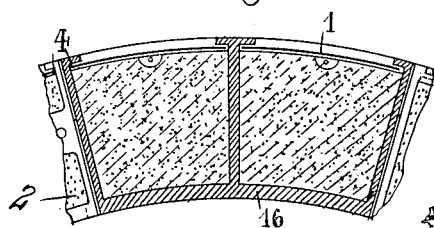
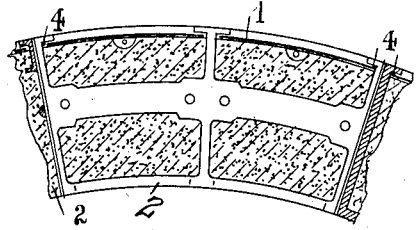
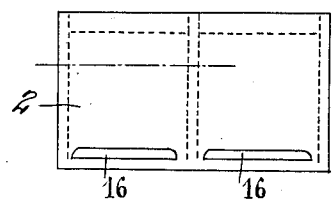
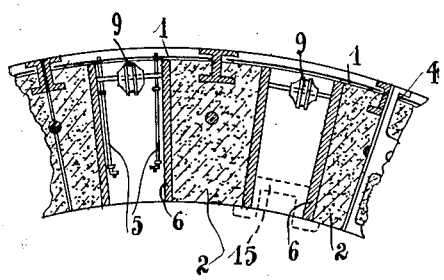
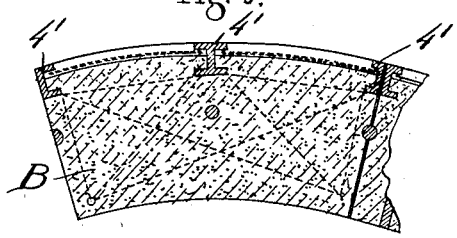
Witnesses
Wm. D. Bell.
Adele Glatt.
Inventor,
Gustave Chenot,
by Gartner Lurard,
Attorneys

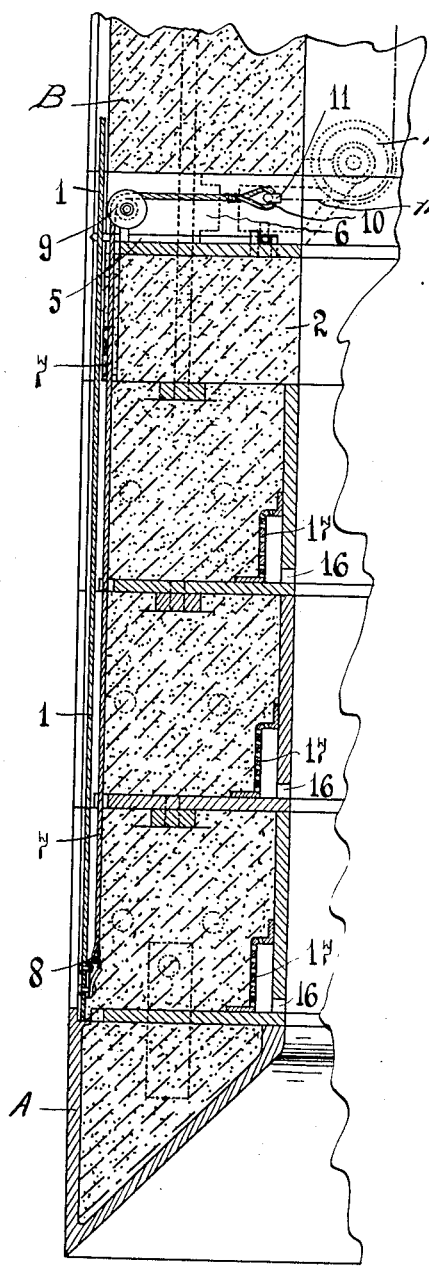
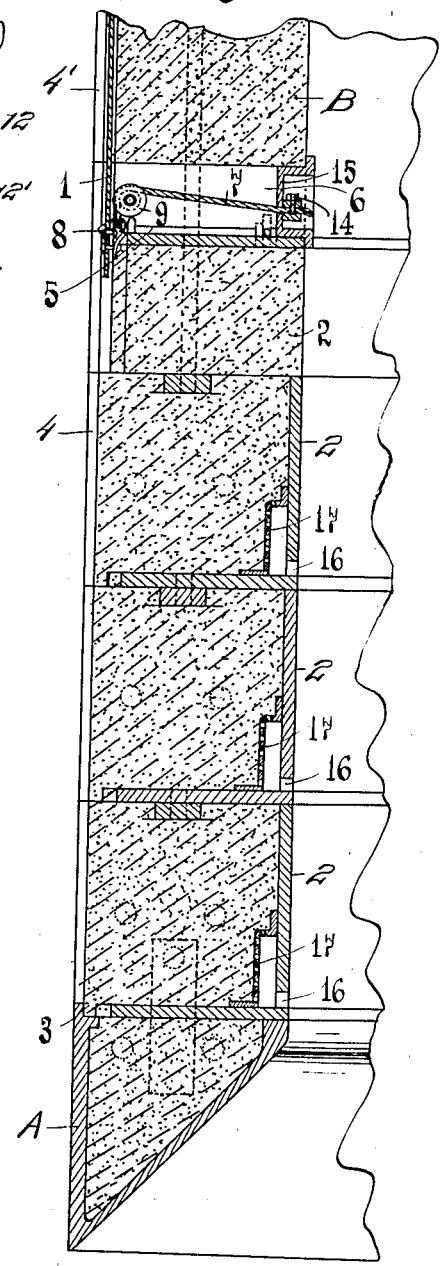

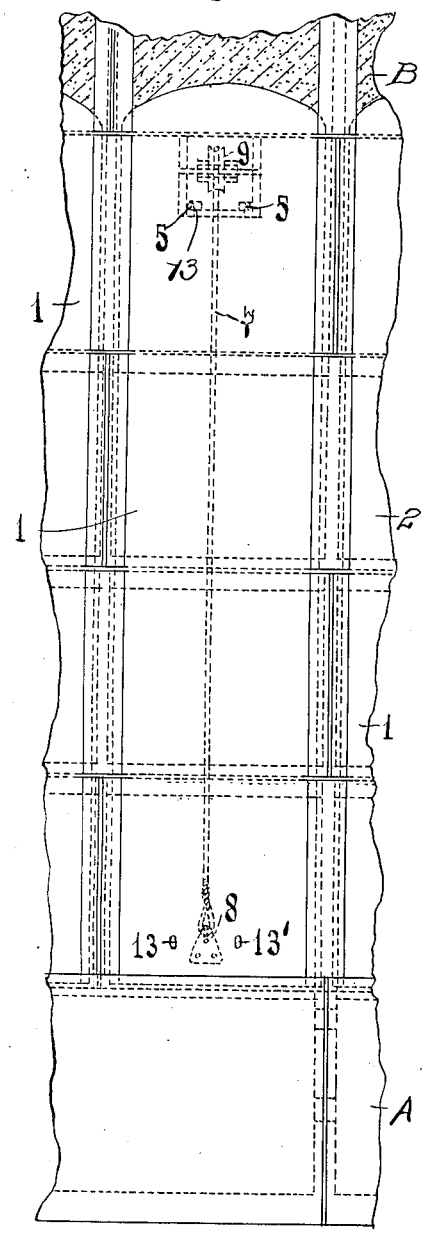
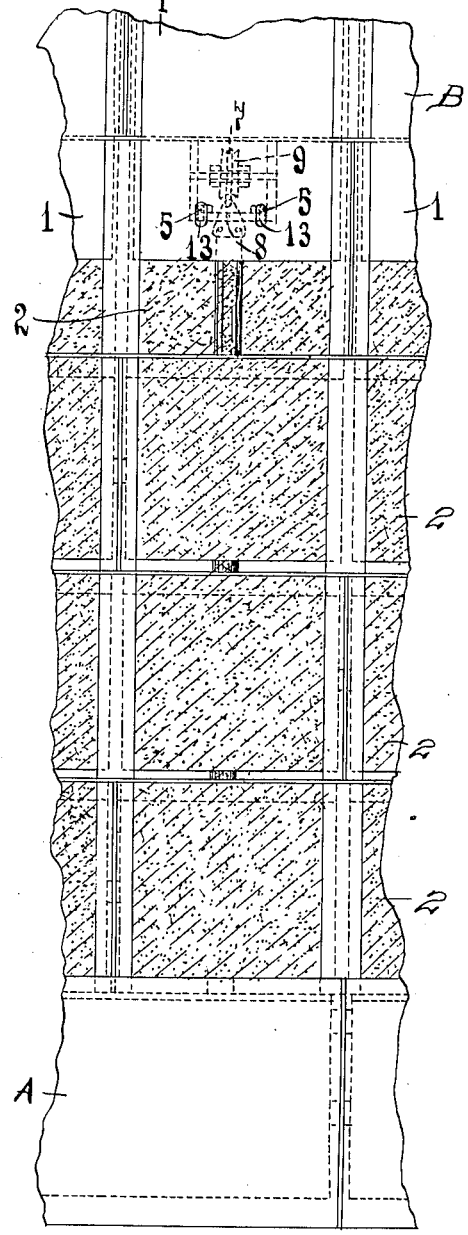

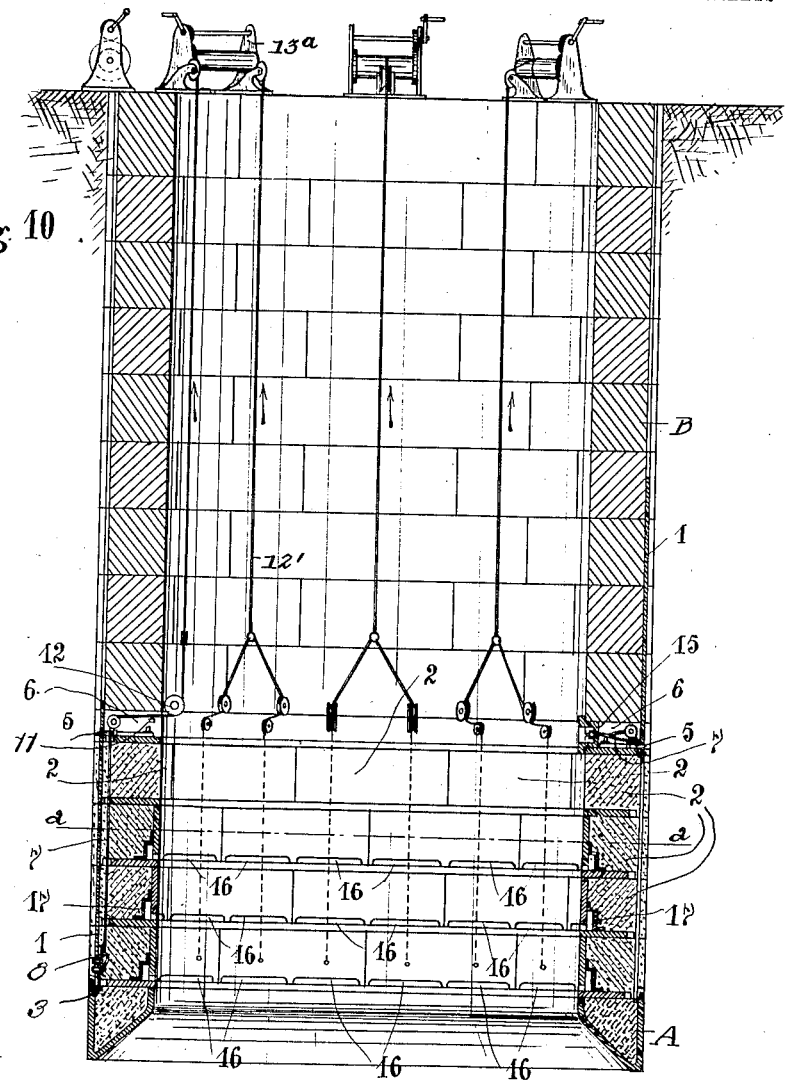
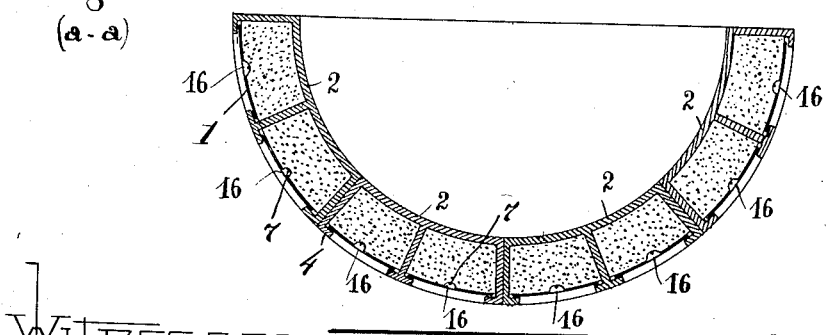

UNITED STATES PATENT OFFICE.

GUSTAVE CHENOT, OF BRUSSELS, BELGIUM.

FILTERING-WELL.

No. 892,581.　　　　Specification of Letters Patent.　　Patented July 7, 1908.

Application filed November 30, 1906. Serial No. 345,627.

*To all whom it may concern:*

Be it known that I, GUSTAVE CHENOT, engineer, a subject of the Belgian King, and residing at Brussels, Belgium, have invented new and useful Improvements in Filtering-Wells; and I do hereby declare the following to be a full, clear, and exact description of the same.

My present invention relates to filtering wells and it consists in certain improvements, hereinafter particularly described and finally embodied in the clauses of the claim, whereby the filtering portion of the well-wall is coated or surrounded by an external water-excluding shell, preferably sectional in form, during the sinking of the well, and is subsequently uncovered by removing said shell vertically so that the water may find its way into the well when the sinking thereof is completed.

My invention will be found fully illustrated in the accompanying drawing, wherein, Figure 1 is a vertical sectional view through the filtering part of the wall, the shell section appearing in its lowermost position; Fig. 2 is a similar view with said shell section elevated; Fig. 3 is an outside elevation of the parts as seen in Fig. 1; Fig. 4 is an inside elevation of the parts as seen in Fig. 2; Fig. 5 is a plan view of the shoe of the sinking wall of the well; Fig. 6 is a hollow sectional view through one of the sections of the wall above said shoe, said figure showing also said section in inside elevation; Fig. 7 is a plan view of what is seen in Fig. 6; Fig. 8 is a hollow sectional view through a hollow cast iron brick; Fig. 9 is a horizontal sectional view of a portion of the non-filtering part of the well; Fig. 10 is a vertical sectional view of the well; Fig. 11 is a horizontal sectional view of the well in the plane of one of the filtering sections, on line *a—a*, Fig. 10.

The well is to be understood as being of that kind which is driven by superposing the filtering sections and the imperforate or solid sections in the order named on the tapering shoe. According to my invention, in order to exclude water during the sinking of the well, an exterior shell, preferably sectional in form, is arranged so as to surround the filtering sections and descend therewith in the sinking operation, and, when the sinking of the well is finished, said shell is adapted to be drawn upwardly so that the water may find its way through the filtering sections. To this end the construction is as follows:

A is the inner tapering cast iron shoe filled with concrete and formed with a groove 3 on its upper surface near its outer or curved surface. The filtering sections of the wall of the well, marked 2 on the drawings, are cast iron forms which are superposed on the shoe A and each of which has an opening 16 near the bottom of its inner wall, and a grating 17 over said opening and is filled with the filtering material. Each form is open on the outside, being provided with opposed flanges 4, these flanges and the groove 3 of the shoe A serving to hold in place the sections of the shell or casing above referred to and marked 1 on the drawing whose function it is to temporarily prevent the inflow of water through the filtering sections while the well is being driven. Each upper non-filtering section B of the well has the flanges 4' which are continuations of the flanges 4 and have the function of guiding the sections 1 when the same are raised in the manner to be explained.

Before superposing the non-filtering sections, the hollow cast iron blocks 6 are laid on the top filtering sections 2. Each of these carries a pulley 9 over which runs a cable 7 connected at 8 at its lower end to one of the sections 1 and at its upper end adapted to be temporarily hooked over a stud 11 where said cable is formed with a loop 10 to receive the stud. Sliding bolts 5 are arranged in the hollow blocks 6 and adapted to engage in holes 13 13' in the sections of the casing 1 to hold each section down while the well is being sunk and elevated when it is once raised by the cable 7.

The cables 7 may be wound up by the windlasses 13ª shown in Fig. 10 for the purpose of elevating the sections 1, and when said sections have been so elevated, the blocks 6 are closed off by means of the curved plates 15 which are penetrated by the cables and which are provided with set screws 14 to secure the cables after the sections 1 have been raised.

The cables 7 have other cables 12' which are connected to the loops 10 of the cables 7 on the one hand and to the windlasses 13ª on the other, said cables 12' passing around the pulleys 12 in the blocks 6.

Having thus fully described my invention, what I claim as new and desire to secure by Letters Patent is:

1. In a filtering well, the combination, with the filtering part of the well, of a casing surrounding said filtering part, said casing being divided into vertical sections, means for guiding said sections for movement vertically, ropes attached to said sections and extending therefrom upwardly, hollow blocks arranged in the filtering part of the well, and a pulley arranged in each hollow block, each rope being extended over a pulley, substantially as described.

2. In a filtering well, the combination, with the filtering part of the well, of a casing surrounding said filtering part and being divided into vertical sections, means for guiding said sections for vertical movement, ropes attached to said sections and extending upwardly therefrom, hollow blocks arranged in said filtering part, a pulley arranged in each hollow block, each rope being extended around a pulley, and means for preventing the upward movement of the sections during the sinking of the well, substantially as described.

3. In a filtering well, the combination, with the filtering part of the well, of a casing surrounding said filtering part and being divided into vertical sections, means for guiding said sections for vertical movement, ropes attached to said sections and extending upwardly therefrom, hollow blocks arranged in said filtering part, a pulley arranged in each hollow block, each rope being extended around a pulley, and means for securing the sections elevated relatively to the filtering part of the well, substantially as described.

In testimony whereof, I have signed my name to this specification in the presence of two subscribing witnesses.

GUSTAVE CHENOT.

Witnesses:
CHARLES HONOLD,
GREGORY PHELAN.